Patented Nov. 12, 1946

2,410,839

UNITED STATES PATENT OFFICE 2,410,839

PRODUCTION OF UNSATURATED HYDROCARBON PRODUCTS

Fritz S. Rostler, Vilma Mehner Wilson, and Hubert I. du Pont, Wilmington, Del., assignors to Wilmington Chemical Corporation, Wilmington, Del., a corporation of Delaware No Drawing. Application July 22, 1943, Serial No. 495,778

2 Claims. (Cl. 196—13)

This invention relates to improvements in the production, from petroleum refining residues, of unsaturated hydrocarbon products useful in the compounding of rubber compositions, in the production of synthetic resins and for other purposes.

Useful unsaturated hydrocarbon products may be produced from various types of petroleum refining residues, such as the acid sludges obtained on refining petroleum lubricating oil fractions with sulfuric acid, or the residues obtained in the refining of similar petroleum fractions by differential solvent extraction, for example, with dichlorethyl ether, furfural, nitrobenzene, phenol, sulfur dioxide, sulfur dioxide-benzene or cresylic acid-propane.

These unsaturated hydrocarbon products have a composition of approximately 90 per cent carbon and 10 per cent hydrogen, corresponding to the general formula $(C_3H_4)_n$. Their molecular weights vary from about 300 to 1000 and usually average about 400. They have a reddish brown color, and may be oils of high viscosity or resin-like substances at ordinary temperatures. Their specific gravities are usually greater than 1.0 and their boiling range is usually between 160° and 380° C. at a pressure of 12 mm. of mercury. These hydrocarbon products are characterized by very rapid decrease in viscosity with increase in temperature. Their viscosities are quite high at low temperatures but quite low at elevated temperatures. For example, products having viscosities at room temperature between 1000 and 100,000 centipoises have at 100° C. viscosities of between 5 and 30 centipoises. Their iodine numbers are low, generally below 60. In a pure state these hydrocarbon materials are completely soluble in concentrated and/or fuming sulfuric acid. They have a great affinity for sulfur and are like rubber in that they are vulcanizable with sulfur. By the term "vulcanizable unsaturated hydrocarbon products" as used herein and in the appended claims is meant products having the above set forth characteristics.

These vulcanizable unsaturated hydrocarbon products as heretofore recovered are generally associated with a substantial amount of paraffinic hydrocarbons. The amount of such paraffinic hydrocarbons present in the end-products varies with the amount present in the petroleum acid sludge or solvent extract used as a starting material and when a large percentage of paraffinic hydrocarbons is present in the starting material an undesirably high percentage of paraffinic hydrocarbons may be present in the end-product. Since the vulcanizable, unsaturated hydrocarbon products are customarily used as reactive raw materials, the unreactive paraffinic hydrocarbons present are undesirable impurities, and in high percentages, above about 10.0 per cent by weight, they can render the vulcanizable unsaturated hydrocarbon end-products unsatisfactory for their intended use. For some purposes even much smaller amounts make the hydrocarbon end-products unusable.

The paraffinic hydrocarbon impurities present in an acid sludge can be substantially reduced by centrifuging and those present in solvent extracts can be reduced by first treating with sulfuric acid to obtain a sludge-like material and then centrifuging to remove paraffinic hydrocarbons. This procedure is, however, wasteful and expensive. The paraffinic hydrocarbons cannot be separated in substantial quantity by distillation either from solvent extracts or from the vulcanizable unsaturated hydrocarbon products, since the boiling range of the components of the mixture usually overlap. It is desirable, therefore, to provide a method of separating the vulcanizable unsaturated hydrocarbon products and the solvent extracts from which they are obtained, from the saturated paraffinic hydrocarbons present therein.

It is an object achieved by the present invention to provide a process for the separation of paraffinic hydrocarbons from the vulcanizable unsaturated hydrocarbon products obtainable from petroleum acid sludges and solvent extracts, or from the solvent extracts from which they are obtained, and to recover such vulcanizable unsaturated hydrocarbon products and solvent extracts of petroleum containing less than about 10.0 per cent by weight, advantageously as little as 0.5 per cent of paraffinic hydrocarbons.

In carrying out the process of our invention we may treat either a vulcanizable unsaturated hydrocarbon product obtained from a petroleum refining residue, and containing an excessive amount of paraffinic hydrocarbon, or a solvent extract of petroleum containing an excessive amount of paraffinic hydrocarbons, with a solvent miscible with the unsaturated portion of the material treated in substantially all proportions at room temperature and below, but immiscible at room temperature and below with the paraffinic hydrocarbons, and thereafter cooling the resulting mixture to a temperature at which stratification between the paraffinic hydrocarbons and the solution of vulcanizable unsaturated hydrocarbons will take place, settling the mixture, separating the layers and recovering the desired products from the solvent layer by distilling off the solvent. In its most advantageous form the process is carried out by treatment of the mixed unsaturated vulcanizable material and the paraffinic material with a solvent as above outlined in admixture with a light saturated hydrocarbon material having a boiling range below that of the vulcanizable, unsaturated hydrocarbons, such as petroleum ether, gasoline or kerosene and thereafter settling and separating the mixture at room temperature or below. Thus any saturated hydrocarbons remaining in the unsaturated material are substantially low boiling and easily removable by distillation. In such case we have found that the paraffinic content of the vulcanizable unsaturated products can be reduced to a point as low as 0.5 per cent by weight. In this manner vulcanizable unsaturated hydrocarbons containing an excessively large amount of paraffinic hydrocarbons can be freed of paraffinic or unsaturated constituents or a solvent extract of petroleum containing an excessive amount of paraffinic hydrocarbons can be rendered suitable for the production of a maximum yield of the vulcanizable unsaturated hydrocarbon product.

The process of our invention may be carried out in a single or multiple batch operation or in a continuous operation. In most cases a continuous flow operation will be found economically most advantageous for commercial production of the vulcanizable unsaturated hydrocarbon products containing less than 10 per cent of paraffinic hydrocarbons whether the starting material is a vulcanizable unsaturated hydrocarbon product containing excessive amounts of paraffinic impurities or is a petroleum oil solvent extraction residue from which such vulcanizable saturated products may be produced.

The solvent used in carrying out the process of our invention is a solvent for the vulcanizable unsaturated portion of the material treated, and is advantageously an organic solvent material which is miscible in all proportions with the vulcanizable unsaturated material over a relatively wide temperature range. The solvent is also advantageously miscible completely with the paraffinic hydrocarbons at elevated temperatures but is substantially completely immiscible with the paraffin hydrocarbons at lower temperatures. Typical examples of suitable solvents for the purpose of our invention are furfural, phenol, furfuryl alcohol and aniline.

The proportion of solvent to treated material used in our process may be varied over a wide range depending on the particular solvent used, the nature of the material extracted and temperature and other conditions under which the process is carried out. We have found in general, however, that the proportion of solvent to material extracted should be at least about 2:1 by volume and in most cases is advantageously somewhat higher. Particularly good results have been obtained when furfural is used as the solvent in batch operation by using proportions of about 4:1 by volume of solvent to material treated. In a continuous operation a proportion of 3:1 can be used advantageously. It is generally desirable that the solvent used contain a small amount of moisture rather than being completely anhydrous and good results have been obtained with solvents containing as high as 6 per cent of water.

The material to be treated may be mixed with the solvent at room temperature with thorough agitation until a substantially uniform distribution of the material treated in the solvent is obtained. The mixture may then be cooled to a substantially lower temperature and settled. In most cases, however, we have found it more advantageous to mix the solvent with the material to be extracted at a somewhat elevated temperature, usually between 50° and 100° C., and thereafter cool the resultant solution or mixture to a substantially lower temperature, for example room temperature or below, and settle the mixture. In this way a somewhat better separation of the paraffinic hydrocarbons from the vulcanizable unsaturated hydrocarbon products can be obtained.

Upon settling the mixture stratifies into an upper layer containing the paraffinic hydrocarbons and a lower layer containing the vulcanizable unsaturated hydrocarbon products in solution in the solvent. The layers may then be separated by any usual means as for example by decantation or otherwise. The solution of vulcanizable unsaturated hydrocarbon product in the solvent may then be distilled to separate the solvent which may be returned to the process for reuse. The vulcanizable unsaturated hydrocarbon products remaining after the distillation will contain usually only about 6 to 10 per cent by weight of saturated hydrocarbons and are suitable for most uses of such products. If it is desired to obtain a product having a lower content of paraffinic hydrocarbons, the product obtained from our process may be retreated by the same process and further amounts of paraffinic hydrocarbons removed.

When it is desired to obtain a product containing still lower amounts of saturated hydrocarbons we have found it more advantageous however to carry out the process of our invention using a solvent for the vulcanizable unsaturated hydrocarbon materials as above described in combination with a diluent for the saturated hydrocarbons. The diluents found most useful are the substantially saturated light hydrocarbons such as gasoline and normally liquid gasoline components such as hexane and heptane, and other light petroleum fractions such as naphtha, kerosene, petroleum ether and the like. The diluent must also be substantially insoluble in or immiscible with the solvent for the vulcanizable unsaturated products at the temperature of settling to be used.

In general when a diluent for the paraffinic hydrocarbons is used with the solvent for the vulcanizable unsaturated hydrocarbon materials the process may be carried out in substantially the same way as when the solvent is used alone. The diluent is advantageously added in an amount at least equal to the amount of paraffinic hydrocarbons present in the material treated, as determined by preliminary analysis. The practical range for commercial purposes is 0.5 to 10 times the amount of paraffinic hydrocarbons. The diluent may be first mixed with the solvent and the material to be treated may be dissolved in the mixture, advantageously at a somewhat elevated temperature, and thereafter cooled and settled. Or the diluent may be first mixed with the material to be treated and the resulting mixture with the solvent and heated, and thereafter cooled and settled.

Upon settling a mixture in which both diluent and solvent have been used, the mixture stratifies into an upper layer containing the diluent and the paraffinic hydrocarbons from the material treated, and a lower layer containing the solvent and the vulcanizable unsaturated hydrocarbon products. After separation of the layers by any usual means, the solvent layer can be distilled to recover the solvent and small remaining portions of the diluent and the vulcanizable unsaturated hydrocarbon products. The diluent can be recovered by distillation from the diluent layer for reuse. The vulcanizable unsaturated hydrocarbon products thus obtained contain only very small percentages of paraffinic hydrocarbons usually between 0.5 and 6.0 per cent by weight.

The following specific examples illustrate the results obtainable by the process of our invention:

Example I

A petroleum refining extract obtained by the refining of a lubricating oil with aniline and containing 61 per cent of vulcanizable unsaturated hydrocarbon materials and 39 per cent of paraffinic hydrocarbons, and which gave on distillation no usable fraction, was treated with 2 parts by volume of aniline at room temperature. After agitation the mixture was cooled to −2° C. and allowed to settle. The two layers thus formed were separated and the bottom layer was distilled to remove the aniline. The vulcanizable unsaturated hydrocarbon products obtained as a residue from the distillation contained about 16 per cent of paraffinic hydrocarbons. On fractionation this product gave a 60 per cent yield of unsaturated vulcanizable hydrocarbons containing 9 per cent of saturated hydrocarbons.

A second sample of the same petroleum refining residue was treated with a 2 parts by volume of aniline at a temperature of 100° C. The mixture was thoroughly agitated and cooled to room temperature and allowed to settle. The resulting layers were separated and after distilling off the aniline from the bottom layer the vulcanizable unsaturated hydrocarbon products obtained contained about 13 per cent of paraffinic hydrocarbons. It will be observed from a comparison of these results that better removal of paraffinic hydrocarbons was obtained when somewhat higher temperatures were used.

Example II

A petroleum refining residue obtained in the solvent refining of lubricating oil with sulfur dioxide-benzol mixture, and containing 10 per cent of saturated paraffinic hydrocarbons and 90 per cent of unsaturated vulcanizable materials was treated with 2 parts by volume of furfural at 100° C. The mixture was thoroughly agitated, cooled to room temperature and allowed to settle. The resulting layers were separated and after distilling off the furfural from the bottom layer, a vulcanizable unsaturated product was obtained containing 5 per cent of paraffinic hydrocarbons.

Example III

Fifty parts of the same solvent refining residue as was used in Example II but containing 12 per cent of paraffinic hydrocarbon was treated with a mixture of 100 parts furfural and 6 parts kerosene. The mixture was heated to 100° C. and thoroughly agitated. It was then cooled to room temperature and allowed to settle. After separation of the resulting layers, the bottom layer was distilled to remove the solvent. The resulting vulcanizable unsaturated hydrocarbon product contained 4.4 per cent of paraffinic hydrocarbons.

Example IV

A solvent extract from the refining of lubricating oil with furfural containing 39 per cent of liquid paraffinic hydrocarbons and 5 per cent of solid paraffinic hydrocarbons was treated according to the invention with solvent naphtha as a diluent for the paraffinic hydrocarbons and furfural as a solvent at a temperature of 140° F. The proportion of furfural to solvent extract was 2:1. By employing various ratios of the diluent to the paraffinic hydrocarbons, the paraffinic hydrocarbon content of the extract in the solvent layer was as follows:

Using 0.5:1 diluent to paraffinic hydrocarbons, 8.7 per cent.

Using 1:1 diluent to paraffinic hydrocarbons, 5.9 per cent.

Using 2:1 diluent to paraffinic hydrocarbons, 2.7 per cent.

Using 5:1 diluent to paraffinic hydrocarbons, 1.0 per cent.

Using 10:1 diluent to paraffinic hydrocarbons, 0.4 per cent.

Example V

A sample of vulcanizable unsaturated hydrocarbon products obtained in accordance with the process of U. S. Patent 2,185,951 from an acid sludge produced in the sulfuric acid refining of a lubricating oil fraction, and containing 10 per cent of paraffinic hydrocarbons was treated according to the method of this invention using a mixture of gasoline and furfural. The vulcanizable unsaturated hydrocarbon products were first diluted with 10 per cent of gasoline and then mixed with 4 parts by volume of furfural at 80° C. The mixture was cooled to room temperature and settled. The resulting layers were separated and after distilling off the furfural and traces of gasoline from the bottom layer, a vulcanizable unsaturated hydrocarbon product was obtained containing 0.5 per cent of paraffinic hydrocarbons.

Example VI

A petroleum refining residue obtained in the solvent refining of a lubricating oil using propane and cresylic acid and containing 18 per cent of paraffinic hydrocarbons was treated with a mixture of 360 parts of furfural and 40 parts of kerosene at 100° C. The mixture was thoroughly agitated, cooled to room temperature and settled. The resulting layers were separated and after distillation of the solvent from the bottom layer, a vulcanizable unsaturated product was obtained containing 0.3 per cent of paraffinic hydrocarbon.

Example VII

A petroleum refining residue obtained from the solvent refining of a lubricating oil fraction with furfural, and containing 40 per cent of paraffinic hydrocarbons, was treated at 100° C. with 1 part by volume of furfural. The mixture was thoroughly agitated, cooled to room temperature and settled. The bottom layer was treated with 2 parts of furfural at 100° C. in the same manner. The bottom layer from the second extraction after removal of the solvent by distillation resulted in a product containing 4 per cent of paraffinic hydrocarbons. The same extract treated in the same manner but in the presence of gasoline in a continuous countercurrent extraction process produced a vulcanizable unsaturated product containing 0.5 per cent of paraffinic hydrocarbons, which could be entirely removed by fractional distillation in vacuo.

The vulcanizable unsaturated hydrocarbon products when produced as shown in these examples and used in rubber goods made from natural rubber, produce products having improved physical properties, such as tensile strength and aging characteristics, as compared with those produced from natural rubber and such vulcanizable unsaturated hydrocarbon products from which the paraffinic hydrocarbons have not been removed. A further advantage obtained, particularly with synthetic rubbers using vulcanizable unsaturated hydrocarbon products from which a major proportion of the paraffinic hydrocarbons have been removed, is the fact that the resulting rubber goods do not show an oily surface. Also when products obtained according to our invention are added to synthetic resins, the resulting product is clear and does not show any oil separation, while resins containing unsaturated hydrocarbon products from which the paraffinic hydrocarbons have not been removed are cloudy and have a greasy surface.

While our invention has been described herein with reference to certain specific embodiments thereof by way of example, it is to be understood that this invention is not limited to the details of such embodiments, except as hereinafter defined in the appended claims.

What we claim is:

1. A process of separating paraffinic hydrocarbons from solvent extracts of petroleum and from vulcanizable unsaturated hydrocarbon products obtained from petroleum refining residues, said extracts and said products having a boiling range at least as high as lubricating oils, comprising treating such a material with heptane in combination with furfural, heating to a temperature at which all components of the mixture form a substantially complete solution, cooling the mixture thus formed to a temperature at which stratification between the heptane solution of the paraffinic hydrocarbons and the furfural solution of the vulcanizable unsaturated hydrocarbons takes place, settling the mixture, separating the layers and recovering the vulcanizable unsaturated hydrocarbon products from the bottom layer by distilling off the furfural and any heptane present.

2. A process of separating paraffinic hydrocarbons from solvent extracts of petroleum and from vulcanizable unsaturated hydrocarbon products obtained from petroleum refining residues, said extracts and said products having a boiling range at least as high as lubricating oils, comprising treating such a material with gasoline in combination with furfural, heating to a temperature at which all components of the mixture form a substantially complete solution, cooling the mixture thus formed to a temperature at which stratification between the gasoline solution of the paraffinic hydrocarbons and the furfural solution of the vulcanizable unsaturated hydrocarbons takes place, settling the mixture, separating the layers and recovering the vulcanizable unsaturated hydrocarbon products from the bottom layer by distilling off the furfural and any gasoline present.

FRITZ S. ROSTLER.
VILMA MEHNER WILSON.
HUBERT I. DU PONT.